United States Patent [19]

Takahara

[11] Patent Number: 5,191,495
[45] Date of Patent: Mar. 2, 1993

[54] MAGNETIC HEAD GUIDING DEVICE
[75] Inventor: Hiroki Takahara, Atsugi, Japan
[73] Assignee: Anritsu Corporation, Tokyo, Japan
[21] Appl. No.: 601,785
[22] PCT Filed: Feb. 28, 1990
[86] PCT No.: PCT/JP90/00261
  § 371 Date: Oct. 29, 1990
  § 102(e) Date: Oct. 29, 1990
[87] PCT Pub. No.: WO90/10288
  PCT Pub. Date: Sep. 7, 1990
[30] Foreign Application Priority Data
  Mar. 3, 1989 [JP] Japan .................. 1-49882
[51] Int. Cl.⁵ .................. G11B 5/55; G11B 21/08
[52] U.S. Cl. .................. 360/106; 360/78.02
[58] Field of Search .................. 360/75, 78.01, 78.02, 360/104, 106

[56] References Cited

U.S. PATENT DOCUMENTS

| | | | |
|---|---|---|---|
| 4,079,428 | 3/1978 | Toratani | 360/78.02 |
| 4,261,222 | 4/1981 | Dattilo | 360/106 |
| 4,313,141 | 1/1982 | Yanagida et al. | 360/78.02 |
| 4,630,147 | 12/1986 | Nagase | 360/78.02 |
| 4,752,849 | 6/1988 | Yoshida et al. | 360/106 |
| 4,791,502 | 12/1988 | Tronzano | 360/106 |
| 4,823,219 | 4/1989 | Veda et al. | 360/106 |
| 5,034,836 | 7/1991 | DeMarti, Jr. et al. | 360/104 |

FOREIGN PATENT DOCUMENTS 53-290 1/1978 Japan .
62-41375 10/1987 Japan .

Primary Examiner—Stuart S. Levy
Assistant Examiner—Jefferson Evans
Attorney, Agent, or Firm—Frishauf, Holtz, Goodman & Woodward

[57] ABSTRACT

A guide rail system (2) comprising a guide rail member (8) fixed to a base member (1) and a movable rail member (7) engaged with the fixed guide rail member to freely move together with a magnetic head (4) is used by the present invention as a device for guiding the magnetic head in the width direction of a magnetic tape. Linear guide grooves (9a–9d) are formed on those sides of the fixed and movable guide rail members (8, 7), respectively, which are separated from and opposed to each other. Plural rolling members (10) are sandwiched in rolling contact between the guide grooves (9a, 9c) and between the guide grooves (9b, 9d).

15 Claims, 6 Drawing Sheets

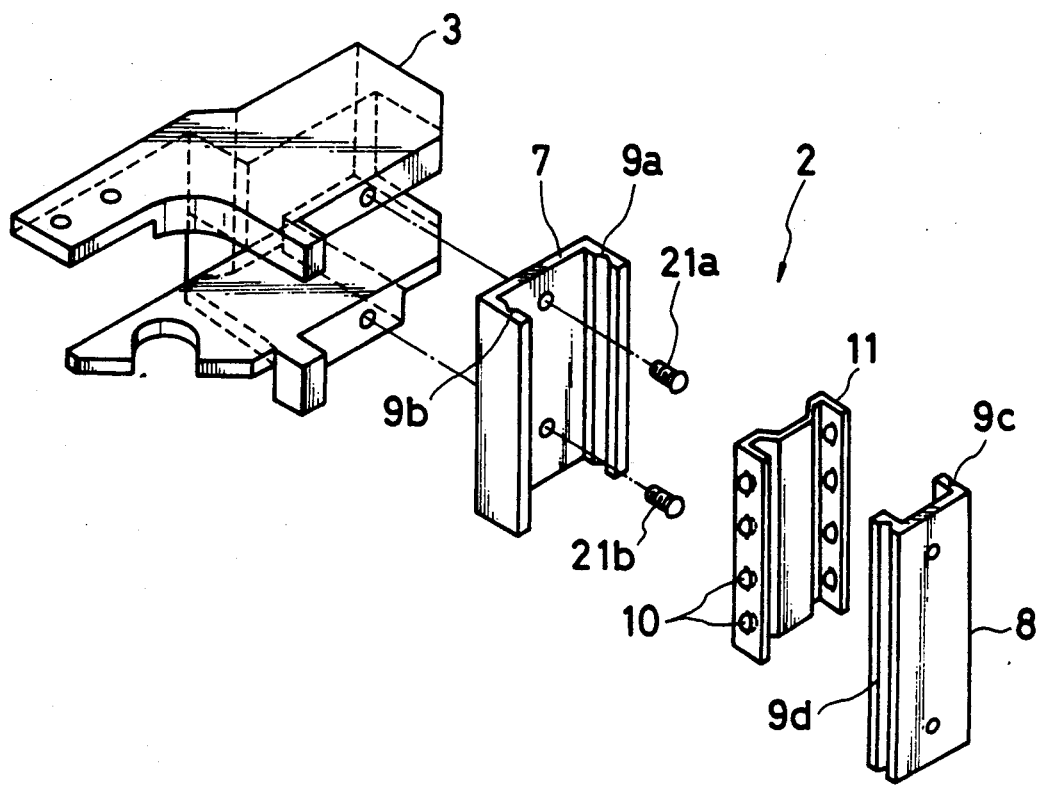
F I G. 2
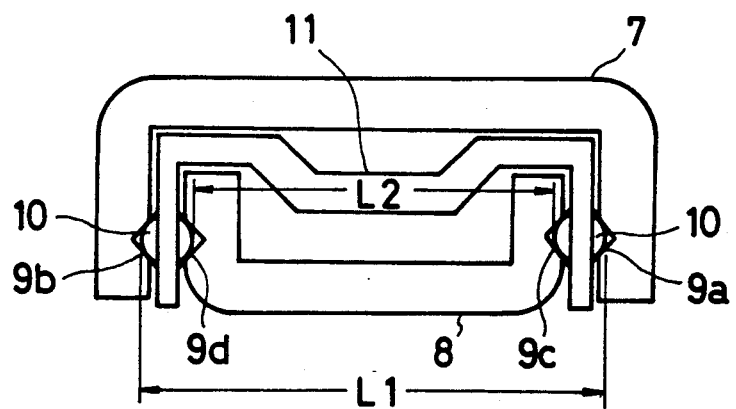
F I G. 3

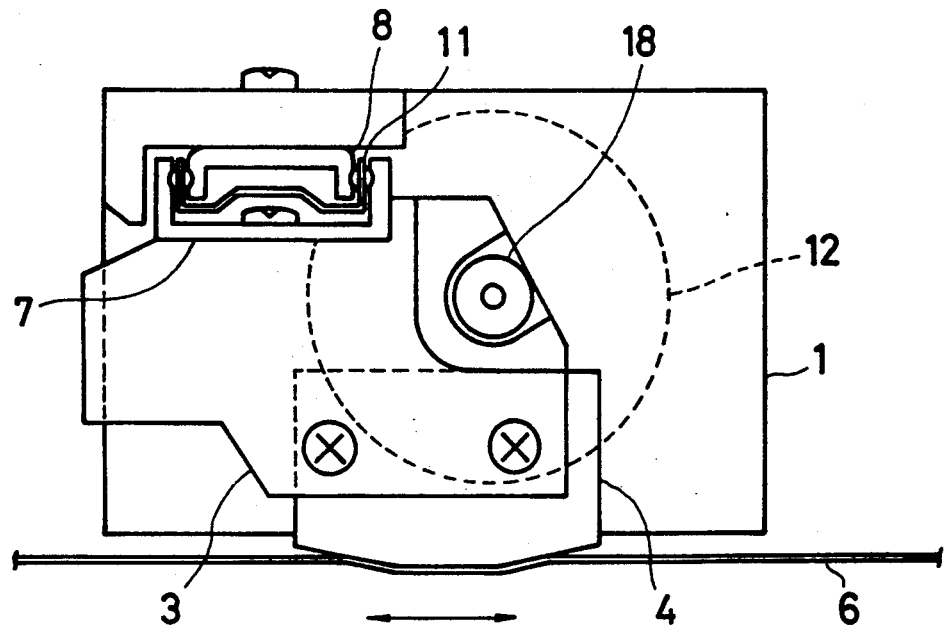
F I G. 6
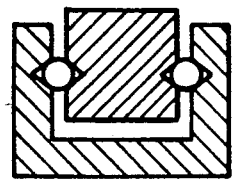
F I G. 7A
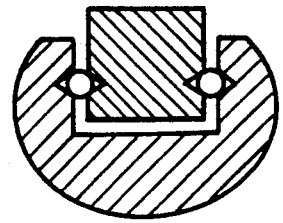
F I G. 7B
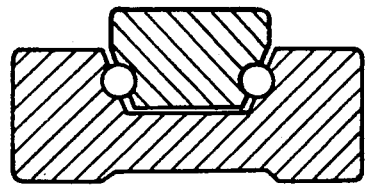
F I G. 7C

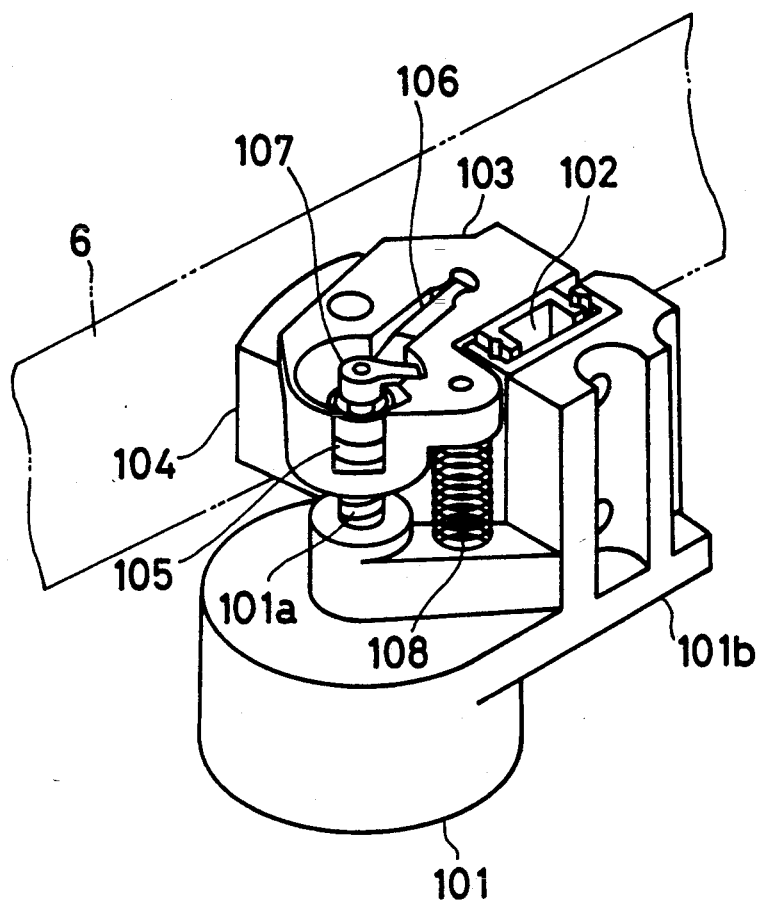
F I G. 8

MAGNETIC HEAD GUIDING DEVICE

FIELD OF THE INVENTION

The present invention relates to a magnetic head guiding device and, more particularly, a device for guiding a magnetic head in the width direction of a magnetic tape which has multi-tracks thereon.

DESCRIPTION OF THE PRIOR ART

Recently, an apparatus for recording and reproducing many pieces of data on and from a magnetic tape, ¼ inches wide, is under development in the field of data processing.

The most important problem in the course of developing the data recording and reproducing apparatus of this type resides in how these many pieces of data are recorded on and reproduced from the magnetic tape. This problem can be solved when many tracks are formed on the magnetic tape.

As the magnetic tape is made to have more and more tracks thereon, however, the magnetic head must be moved in the width direction of the magnetic tape to more accurately gain access to a predetermined track on the magnetic tape. This asks the magnetic head guiding device which is intended to move the magnetic head in the width direction of the magnetic tape to have high positioning accuracy. When 16 tracks are formed on the ¼-inch magnetic tape, for example, the moving amount of the magnetic head which moves from one track to another adjacent track on the magnetic tape is about 360 μm. Therefore, the magnetic head is asked to have extremely high positioning accuracy at the micron level.

Conventionally, a device for guiding the magnetic head in the width direction of the magnetic tape to gain access to any of many tracks on the magnetic tape is disclosed by Published Unexamined Japanese Patent Application No. 63-23219. This conventional magnetic head guiding device uses two slide shafts as members for guiding a carriage for the magnetic head in the width direction of the magnetic tape. The carriage is guided along the slide shafts in this case.

In the case of this conventional magnetic head guiding device, however, a slight clearance must be formed between the carriage and the slide shafts to smoothly guide the carriage.

This clearance between the carriage and the slide shafts in the conventional magnetic head guiding device causes the magnetic head to be tilted relative to the magnetic tape. As a result, the magnetic head can often deviate from the desired track on the magnetic tape under this state.

In order to avoid this undesired state, the conventional magnetic head guiding device uses a coil spring to lean the carriage relative to the slide shafts. According to this measure, however, the carriage moves along the slide shafts while rubbing against the slide shafts. This causes those portions of the slide shafts against which the part of the carriage rubs to be gradually worn so as to tilt the magnetic head more and more relative to the slide shafts.

U.S. Pat. No. 4,609,958 and Published Unexamined Japanese Patent Application No. 59-101061 disclose other magnetic head guiding devices in addition to the above-described conventional one. The conventional magnetic head guiding device disclosed in the U.S. Pat. No. 4,609,958 has plural rollers in a hollow portion enclosing a column-like head positioning post (or guide), wherein a column-like carriage is moved in the width direction of the magnetic tape through these rollers.

However, this conventional magnetic head guiding device needs so many structural parts as to make the device complicated and large-sized, which makes it difficult to house these parts in a limited space of the data recording and reproducing apparatus. Further, pins planted in the carriage are inserted into a groove formed on a rotation stopping block so as to prevent the rotation of the carriage in the case of the arrangement disclosed in this U.S. Patent. Those portions of the pins and the groove which rub against one another become gradually worn to thereby float the magnetic head from the magnetic tape.

On the other hand, the conventional magnetic head guiding device disclosed in the Published Unexamined Japanese Patent Application No. 59-101061 has a graphite piston fixed to the outer circumference of a column-like sleeve (or guide) and a glass cylinder fixed to the inner circumference of a carriage to enclose the outer circumference of the graphite piston, wherein the carriage is slid in the axial direction of the column-like sleeve to guide the magnetic head in the width direction of the magnetic tape. However, such specific wear-proof parts as the glass cylinder and graphite piston are quite expensive to thereby make the cost of the device itself high.

To summarize the above, the arrangement of using the slide shafts as the guide for guiding the carriage in the width direction of the magnetic tape in the case of the conventional magnetic head guiding device disclosed in the Published Unexamined Japanese Patent Application No. 63-23219 had the problem that the magnetic head was tilted relative to the magnetic tape by an angle which was allowed by the clearance between the carriage and the slide shafts.

Further, the arrangement of allowing the carriage to be leaned to the slide shafts by the coil spring in order to prevent the magnetic head from becoming tilted had the problem that the tilting of the magnetic head became larger as those portions of the slide shafts against which a part of the carriage rubs were worn.

Still further, the arrangement of using the rollers and the like in order to reduce the wear of the guide section as disclosed in the U.S. Pat. No. 4,609,958 had the problem that the device became so complicated and large-sized as to make it impossible to house the device in the limited space of the data recording and reproducing apparatus.

Still further, the arrangement of using the specific wear-proof parts instead of the above-mentioned rollers as disclosed in the Published Unexamined Japanese Patent Application No. 59-101061 had the problem that these specific parts became a cause for making the cost of the device high.

In other words, any of the above-described conventional magnetic head guiding devices is not practically satisfied and there is a bottleneck in the development of the magnetic recording and reproducing apparatus in the field of information processing where the magnetic tape is asked to become higher in quality and have more and more tracks thereon.

SUMMARY OF THE INVENTION

The object of the present invention is to provide a magnetic head guiding device capable of eliminating the problems of the conventional techniques, having an arrangement as simple and cheap as possible, and accurately guiding the magnetic head to a predetermined position on the magnetic tape in the width direction of the tape without causing the magnetic head to be tilted relative to the magnetic tape.

According to the present invention, this object of the present invention can be achieved by a device for guiding a magnetic head on a magnetic tape in the width direction of the magnetic tape comprising:

base member;

fixed guide rail member supported by the base member and provided with first and second guide grooves extending in the width direction of the magnetic tape but separated from each other in a direction perpendicular to the width direction of the magnetic tape;

a movable guide rail member arranged freely movable in the width direction of the magnetic tape and provided with third and fourth guide grooves which are separated from each other, opposing to the first and second guide grooves of the fixed guide rail member;

a magnetic head supported to move together with the movable guide rail member; and a plurality of rolling members sandwiched in rolling contact between the first and the third guide groove which are opposed to each other and between the second and the fourth guide groove which are opposed to each other.

According to the present invention, a guide rail system comprising a fixed guide rail member fixed to the base member and the movable guide rail member engaged with the fixed guide rail member to freely move together with the magnetic head is used as the magnetic head guiding device for guiding the magnetic head in the width direction of the magnetic tape, first through fourth guide grooves are formed on those sides of the both guide rail members which are separated from and opposed to each other, and the plural rolling members are held freely rotatable between these opposed guide grooves, so that the magnetic head can be guided and moved together with the movable guide rail member due to the rolling contact of the rolling members relative to the both guide rail members.

According to the magnetic head guiding device of the present invention, the magnetic head can be accurately guided to the predetermined position on the magnetic tape in the width direction of the tape without becoming tilted relative to the tape although its arrangement is simplified to the greatest extent.

BRIEF DESCRIPTION OF THE DRAWINGS

FIG. 2 is a perspective, blown apart, view showing a guide rail system in FIG. 1;

FIG. 3 is a plan view showing the guide rail system in FIG. 2;

FIG. 6 is a plan showing the magnetic head guiding device in FIG. 1;

FIGS. 7A, 7B and 7C show variations of the guide rail system in FIG. 1;

FIG. 8 is a perspective view showing a second example of the magnetic head guiding device according to the present invention.

DETAILED DESCRIPTION OF THE PREFERRED EMBODIMENT

Figure 1:
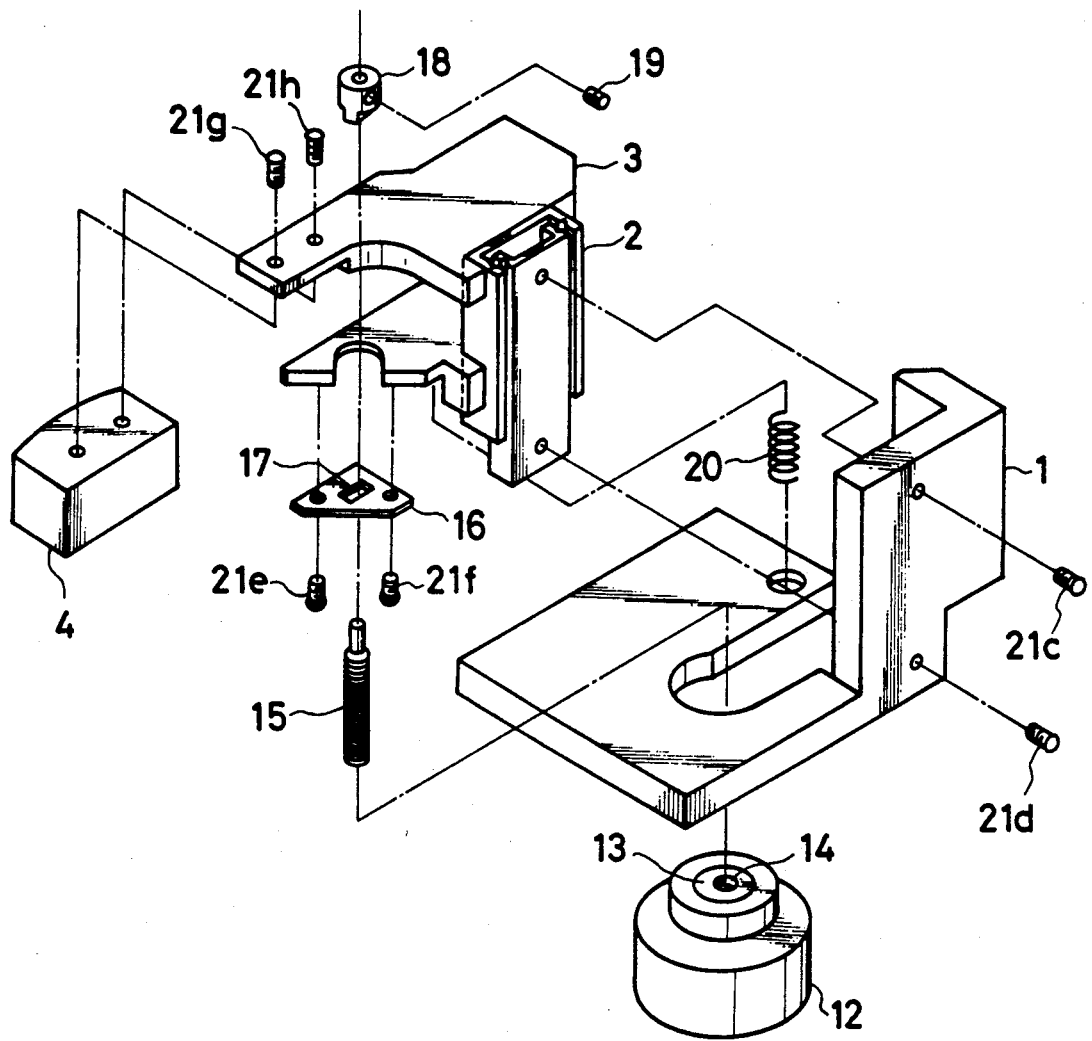
FIG. 1 is a perspective, blown apart, view showing a first example of the magnetic head guiding device according to the present invention.
Figure 4:
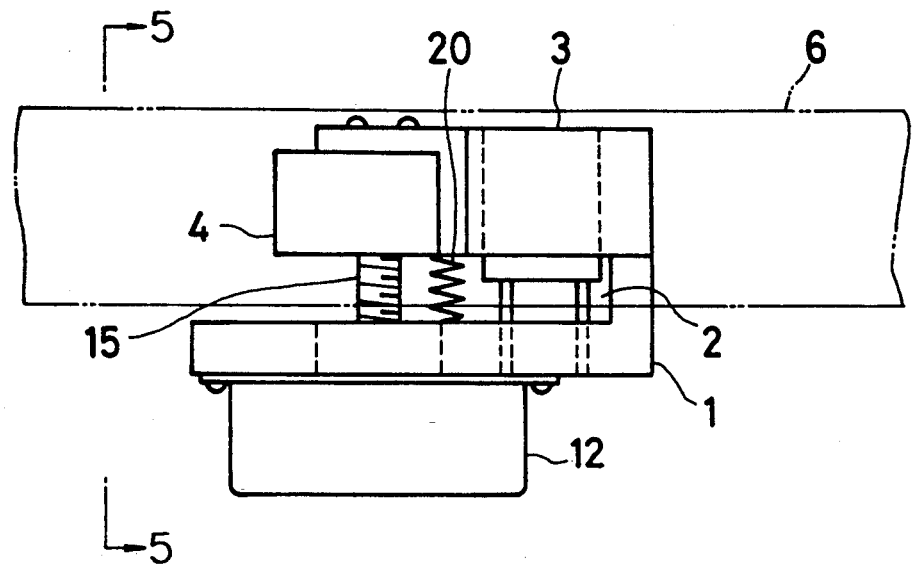
FIG. 4 is a side elevational view showing the magnetic head guiding device in FIG. 1.
Figure 5:
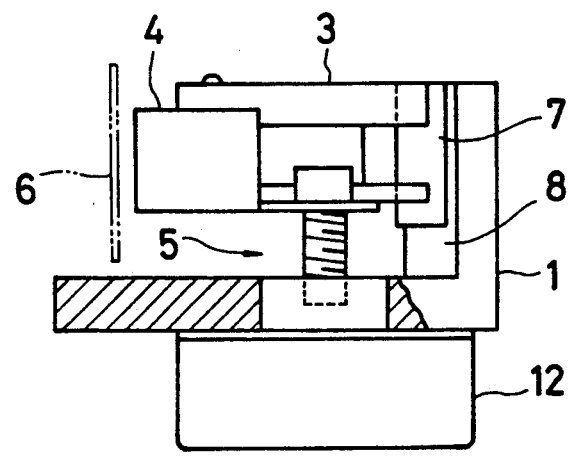
FIG. 5 shows the magnetic head guiding device viewed in the direction of arrows 5—5 in FIG. 4.

Some embodiments of the present invention will be described in detail referring to the accompanying drawings.

In FIGS. 1 through 6 which show a first example of the magnetic head guiding device according to the present invention, reference numeral 1 represents an L-shaped side which serves as a base member, and a carriage (or head support member) 3 is attached to the inner vertical face of this base member 1 through a guide rail system 2. A magnetic head 4 is attached to the head support member 3 by means of screws 21g and 21h and it is driven by a drive system 5 through the head support member 3 to move in the width direction of a magnetic tape 6.

The guide rail system 2 includes a first guide rail member 7 fixed to the head support member 3 by screws 21a and 21b and shaped like a fallen U in section, and a second rail member 8 fixed to the base member 1 by screws 21c and 21d and shaped like a fallen U in section. The second guide rail member 8 is held inside the first guide rail member 7 and opposed to the latter. First and second linear guide grooves 9a and 9b each having a V-shaped section are formed on the inner face of the first guide rail member 7, opposing to third and fourth linear guide grooves 9c and 9d having a V-shaped section and formed on the outer face of the second guide rail member 8. A fallen-U-shaped retainer 11 which holds plural rolling members 10 such as a ball freely movable and projected outside from both sides thereof is sandwiched between the first 9a and the third linear guide groove 9c and between the second 9b and the fourth linear guide groove 9d, respectively. The first 7 and the second guide rail member 8 are made slidable by the rolling contact of these plural rolling members 10.

Namely, the second guide rail member 8 supported by the base member 1 serves as a fixed one while the first guide rail member 7 supported by the head support member (or carriage) 3 serves as a movable one in this case.

Free drop of the retainer 1 which is sandwiched between the first 7 and the second guide rail member 8 to hold the plural rolling members 10 freely movable between them is prevented as follows. As shown in FIG. 3, a difference of outer and inner dimensions L1 and L2 between the two rows of the rolling members 10 held in the both sides of the retainer 11 is a little larger than a difference between the distance between first guide groove 9a and the second guide groove 9b and between the third guide groove 9c and the fourth guide groove 9d. The first 7 and the second guide rail member 8 are thus slightly pressed against the rolling members 10 between them. Therefore, the retainer 11 moves substantially half the moving distance of the second guide rail member 8 which serves as the movable one, but it can be prevented from freely dropping between the first 7 and the second guide rail member 8.

However, the retainer 11 is not necessarily needed, for example when the number of the rolling members 10 is increased and they are arranged in close contact, the retainer 11 which serves to hold them will not be needed. In this case, however, a member is needed to prevent the rolling members 10 from coming out between the guide grooves. FIGS. 7A, 7B and 7C show variations of the guide rail system which include no retainer.

Again in FIGS. 1 through 6, the drive system comprises a stepping motor 12 attached to the underside of the horizontal bottom of the base member 1, a screw hole 14 formed in the center of a rotating shaft 13 of the stepping motor 12, a screw shaft 15 screwed into the screw hole 14 through a through-hole formed in the horizontal bottom of the base member 1, a fixed member 16 fixed to the head support member 3 by screws 21e and 21f, a slit 17 formed in the fixed member 16, a rotation stopper member 18 fitted into the slit 17, and a stopper screw 19 for fixing the top of the screw shaft 15 to the rotation stopper member 18, wherein the screw shaft 15 is driven in the axial direction thereof by the rotation of the stepping motor 12 to move the head support member 3, that is, the magnetic head 4 in the width direction of the magnetic tape 6 under the guidance of the guide rail system 2. A compression coil spring 20 is inserted between the base member 1 and the head support member 3 to urge the head support member 3 in the direction of its separating from the base member 1 against the back-rush of the screw shaft 15.

The magnetic head guiding device arranged as described above employs the guide rail system 2 which is intended to use the rolling contact of the rolling members 10 to guide the magnetic head supported by the head support member 3 in the width direction of the magnetic tape 6. This enables the magnetic head 4 to be accurately guided and moved to a predetermined position on the magnetic tape 6 in the width direction thereof.

Namely, the guide rail system 2 employed by the present invention comprises the first guide rail member 7 fixed to the head support member 3 and shaped like a fallen U in section, the second guide rail member 8 located inside the first guide rail member 7, fixed to the base member 1 and shaped like a fallen U in section, and the plural rolling members 10 sandwiched between the first 9a and the third linear guide groove 9c which are formed on the inner and outer faces of the first and second guide rail members 7 and 8, opposing to each other, and each having a V-shaped section and also between the second 9b and the fourth linear guide groove 9d which are formed on the inner and outer faces of the first and second guide rail members 7 and 8, opposing to each other, and each having a V-shaped section, wherein the rolling contact of the rolling members 10 between the first 7 and the second guide rail member 8 is used.

The present invention makes it unnecessary, therefore, to provide a clearance between the slide shaft and the carriage as seen in the case of the above-mentioned Published Unexamined Japanese Patent Application No. 63-23219 in which the slide shaft is used as a guide for the magnetic head. This makes it possible to prevent the magnetic head 4 from being tilted relative to the magnetic tape 6 and to accurately move the magnetic head 4 to an of predetermined positions on the magnetic tape in the width direction thereof.

Further, the present invention employs no roller to reduce the wear of the guide section, as seen in the case of U.S. Pat. No. 4,609,958. The guide device can be therefore made as simple and small-sized as possible without becoming complicated and large-sized. This enables the magnetic head guiding device to be easily and reliably housed in a limited space of the data recording and reproducing apparatus.

Still further, the present invention is intended to use the rolling contact of the plural rolling members 10 between the first 7 and the second guide rail member 8. This makes it unnecessary to use such specific and expensive wear-proof material such as graphite which is employed by the above-mentioned Published Unexamined Japanese Patent Application No. 59-101061, thereby preventing the cost of the magnetic head guiding device from being becoming high.

Still further, the plural rolling members 10 are sandwiched between the first 9a and the second linear guide groove 9c which are formed in the inner and outer faces of the first and second guide rail members 7 and 8, opposing to each other, and each having a V-shaped section, and also between the second 9b and the fourth linear guide groove 9d which are formed on the inner and outer faces of the first and second guide rail members 7 and 8, opposing to each other, and each having a V-shaped section. And the second 9b and the fourth guide groove 9d as well as the first 9a and the third linear guide groove 9c are opposed to each other, using the rolling contact of the rolling members 10 sandwiched between them. Therefore, frictional force acting on these linear guide grooves 9a, 9b, 9c and 9d can be reduced to the greatest extent and the load added to the drive system 5 can also be reduced.

Still further, the present invention makes it unnecessary to enhance their processing accuracy of the first 9a and the third linear guide groove 9c which are opposed to each other and of the second 9b and the fourth linear guide groove 9d which are opposed to each other. When the rolling members 10 each having a radius different from the size of each of the opposed grooves are selected and sandwiched between the grooves, however, these opposed grooves can be easily filled with the rolling members without leaving any clearance between the rolling members and each of the opposed grooves.

Still further, according to the present invention which uses the above-described guide rail system 2, the magnetic head 4 can be made free from any influence of undesired stress caused in directions shown by arrows in FIG. 6 and in response to the running direction of the magnetic tape 6, while contacting the magnetic tape 6. Namely, the plural rolling members 10 sandwiched between the first 7 and the second guide rail member 8 as described above are pressed by these first and second guide rail members 7 and 8 and they are thus positionally limited left and right or in the running directions of the magnetic tape 6 shown by the arrow in FIG. 6. Even if the stress caused according to the running directions of the magnetic tape 6 acts on the magnetic head 4 or the entire magnetic head guiding device, therefore, the magnetic head 4 can be left free from any influence of the stress because the guide rail system 2 positionally limits the movement of the magnetic head in the running directions of the magnetic tape 6.

Although the first guide rail member 7 has been fixed to the head support member 3 and the second guide rail member 8 to the base member 1 in the case of the first example of the magnetic head guiding device according to the present invention, it may be arranged that the first guide rail member 7 is fixed to the base member 1 and that the second guide rail member 8 to the head support member 3. The head support member 3 may be formed integral with the first or second guide rail members 7 and 8. The drive system 5 is not limited to the above-described arrangement, but its arrangement is not necessarily limited if it can move the magnetic head 4 in the width direction of the magnetic tape 6.

Figure 9:
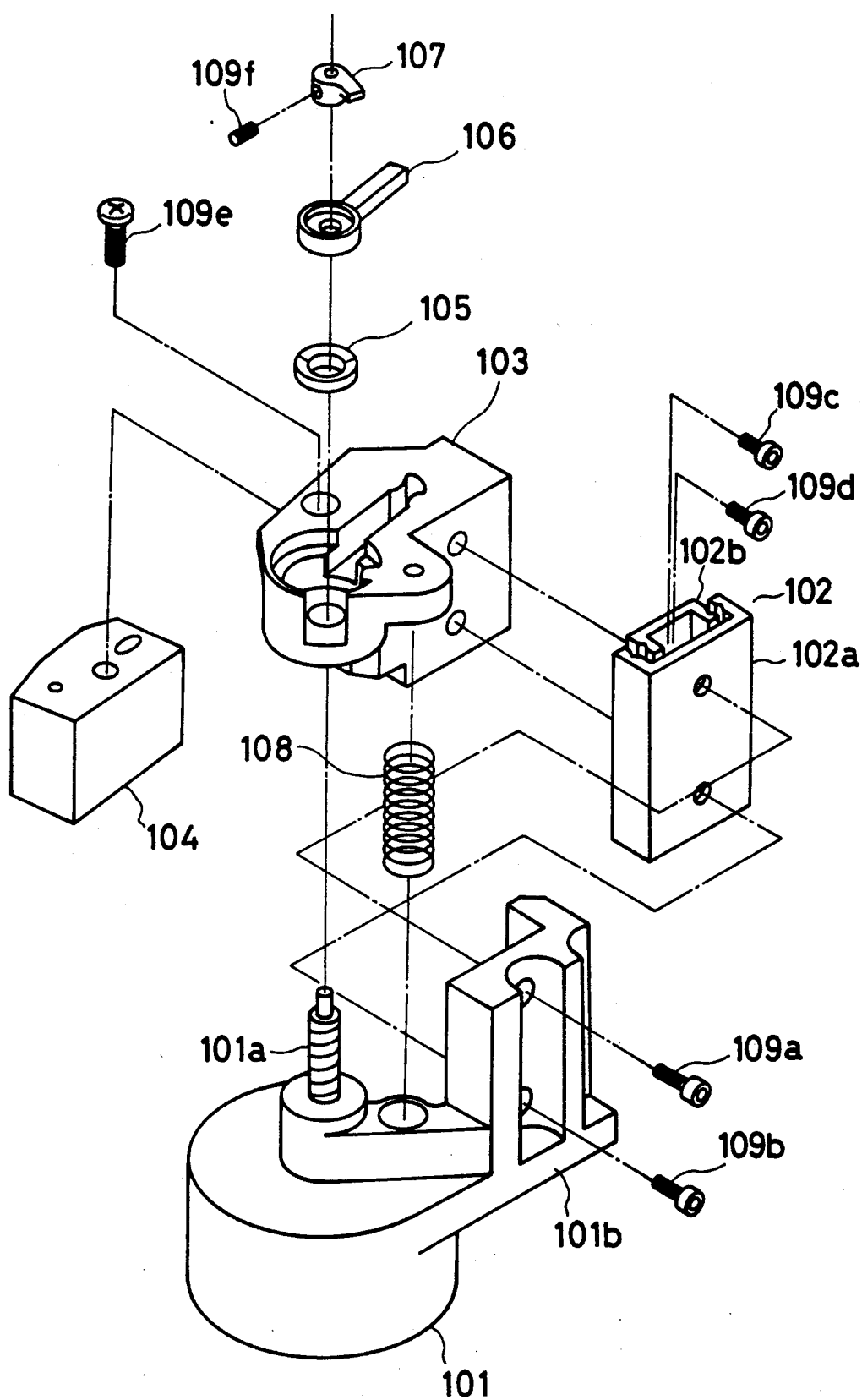
FIG. 9 is a perspective, blown apart, view of the magnetic head guiding device of FIG. 8.

FIGS. 8 and 9 show a second example of the magnetic head guiding device according to the present invention which can move the magnetic head in the width direction of the magnetic tape.

In FIGS. 8 and 9, a fixed guide rail member 102 of a guide rail system 102 shaped like a fallen U in section is attached to a base member 101b integral to a motor 101 by means of screws 109a and 109b. A movable guide rail member 102b shaped like a fallen U in section is located, freely movable up and down, inside the fixed guide rail member 102a in such a relation that the first 7 and the second guide rail member 8 of the guide rail system 2 are located relative to each other in the above-described example of the present invention.

The movable guide rail member 102b is attached to one side of a carriage (or head support member) 103 by means of screws 109c and 109d. A magnetic head 104 is attached to the other side of the head support member 103 by a screw 109e, facing the magnetic tape 6. A feed screw 101a screwed into the shaft of the motor 101 is passed through the head support member 103. A stopper 107 is attached to the top of the feed screw 101a through a spacer 105 and a nut member 106 by means of a screw 109f. A compression coil spring 108 is inserted between the base member 101b and the head support member 103.

The magnetic head guiding device having the above-described arrangement can operate similarly to the case of the first example to accurately guide and move the magnetic head to a predetermined position on the magnetic tape 6 in the width direction thereof.

When the number of tracks formed on the magnetic tape 6 was 16, the pitch of the tracks 360 μm, the pitch of the feed screw 360 μm and the rotation angle of the stepping motor 15 degrees per pulse (or step) in the first and second examples of the present invention, the fed amount of the magnetic head was 15 μm per step of the motor and the magnetic head could be moved from one track to the other adjacent track by 24 steps.

When the number of tracks was increased from 16 to 26, the pitch of the tracks was 228.6 μm, the pitch of the feed screw 1.27 mm and the rotation angle of stepping motor 0.9 degrees per its one pulse (or step), the fed amount of the magnetic head was 3.175 μm per one step of the motor and the magnetic head could be moved from one track to the other adjacent track 72 steps.

It should be understood that the present invention is not limited to the above-described and -shown embodiments and that various changes and modifications can be made without departing from the spirit and scope of the present invention.

According to the present invention described above in detail, therefore, there can be provided a magnetic head guiding device simpler and smaller-sized in arrangement and lower in cost but capable of accurately guiding the magnetic head to a predetermined position on the magnetic tape in the width direction thereof without causing the magnetic head to be tilted relative to the magnetic tape.

The magnetic head guiding device according to the present invention is quite useful for the common magnetic tape recording and reproducing apparatuses including data recording and reproducing ones which are intended to use magnetic tapes whose tracks are being increased more and more in number.

What is claimed is:

1. A magnetic head guiding device for guiding a magnetic head of a data recording/reproducing apparatus over a multi-track magnetic tape in a widthwise direction of the tape in order to record data on and/or reproduce data from the magentic tape, said magnetic head guiding device comprising:
   a base member;
   a fixed guide rail member supported by said base member, said fixed guide rail member including:
     substantially U-shaped cross-section,
     opposite first and second fixed guide rail sides,
     a first fixed rail guide groove formed in said first fixed guide rail side, said first fixed rail guide groove having a V-shaped cross-section and extending in the widthwise direction of the tape, and
     a second fixed rail guide groove formed in said second fixed guide rail side and separated from said first fixed rail direction of the magnetic tape, said second fixed rail guide groove having a V-shaped cross-section and extending in the widthwise direction of the tape; and
   a movable guide rail member movable in the widthwise direction of said tape, said movable guide rail member including:
     a substantially U-shaped cross-section,
     opposite first and second movable guide rail side,
     a first movable rail guide groove formed in said first movable guide rail side in opposition to said first fixed rial guide groove and having a V-shaped cross-section, and
     a second movable rail guide groove formed in said second movable guide rail side in opposition to said second fixed rail guide groove and separated from said first movable rail guide groove in a direction perpendicular to the widthwise direction of the magnetic tape, said second movable rail guide groove having a V-shaped cross-section;
   a plurality of spherical rolling members arranged in rolling contact with and between said first fixed rail guide groove and said first movable rail guide groove, and between said second fixed rail guide groove and said second movable rail guide groove;
   retainer means for holding said rolling members such that said rolling members are rotatable, said retainer means having a substantially U-shaped cross-section and having opposite first and second retainer sides, with said first retainer side being positioned between said first fixed guide rail side and said first movable guide rail side and said second retainer side being positioned between said second fixed guide rail side and said second movable guide rail side, and with dimensions between said first fixed rail guide groove and said first movable rail guide groove and between said second fixed rail guide groove and said second movable rail guide groove are such that said guide grooves apply a pressure to said rolling members therebetween so as to prevent said retainer means from falling out from spaces between said opposite sides of said movable guide rail member; and head supporting means for supporting the movable guide rail member and the magnetic head such that said magnetic head is movable together with said movable guide rail member.

2. A magnetic head guiding device according to claim 1, wherein the magnetic tape has a width of ¼ inch and at least 16 tracks.

3. A magnetic head guiding device according to claim 1, there is a first distance between an outermost point on each of the rolling members held by said first retainer side and an outermost point on a corresponding one of the rolling members held by the second retainer side, a second distance between an innermost point on each of the rolling members held by said first retainer side and an innermost point on a corresponding one of the rolling members held by said second retainer side, a third distance between each of the contacts of said first fixed rail guide groove with the rolling members arranged between said first fixed rail guide groove and said first movable rail guide groove and the corresponding contacts of said second fixed rail guide groove with the rolling members arranged between said second fixed rail guide groove and said second movable rail guide groove, and a fourth distance between each of the contacts of said first movable rail guide groove with the rolling members arranged between said first fixed rail guide groove and said first movable rail guide groove and corresponding ones of the contacts of said second movable rail guide groove with the rolling members arranged between said second fixed rail guide groove and said second movable rail guide groove, and wherein a difference between said first and second distances is slightly larger than a difference between said third and fourth distances.

4. A magnetic head guiding device for guiding a magnetic head of a data recording/reproducing apparatus over a multi-track magnetic tape in a widthwise direction of the tape in order to record data on and/or reproduce data from the magnetic tape, said magnetic head guiding device comprising:

a base member;
a fixed guide rail member supported by said base member, said fixed guide rail member including:
a substantially U-shaped cross-section,
opposite first and second fixed guide rail sides,
a first fixed rail guide groove formed in said first fixed guide rail side, said first fixed rail guide groove having a V-shaped cross-section and extending in the widthwise direction of the tape, and
a second fixed rail guide groove formed in said second fixed guide rail side and separated from said first fixed rail guide groove in a direction perpendicular to the widthwise direction of the magnetic tape, said second fixed rail guide groove having a V-shaped cross-section and extending in the widthwise direction of the tape; and
a movable guide rail member movable in the widthwise direction of said tape, said movable guide rail member including:
a substantially U-shaped cross-section,
opposite first and second movable guide rail sides,
a first movable rail guide groove formed in said first movable guide rail side in opposition to said first fixed rail guide groove and having a V-shaped cross-section, and a second movable rail guide groove formed in said second movable guide rail side in opposition to said second fixed rail guide groove and separated from said first movable rail guide groove in a direction perpendicular to the widthwise direction of the magnetic tape, said second movable rail guide groove having a V-shaped cross-section;
a plurality of spherical rolling members arranged in rolling contact with and between said first fixed rail guide groove and said first movable rail guide groove, and between said second fixed rail guide groove and said second movable rail guide groove;
retainer means for holding said rolling members such that said rolling members are rotatable, said retainer means having a substantially U-shaped cross-section and having opposite first and second retainer sides, with said first retainer side being positioned between said first fixed guide rail side and said first movable guide rail side and said second retainer side being positioned between said second fixed guide rail side and said second movable guide rail side, and with dimensions between said first fixed rail guide groove and said first movable rail guide groove and between said second fixed rail guide groove and said second movable rail guide groove are such that said guide grooves apply a pressure to said rolling members therebetween so as to prevent said retainer means from falling out from spaces between said opposite sides of said fixed guide rail member and said opposite sides of said movable guide rail member;
head supporting means for supporting the movable guide rail member and the magnetic head such that said magnetic head is movable together with said movable guide rail member
feed screw means for moving said magnetic head to a predetermined position on the magnetic tape in the widthwise direction of the tape, said feed screw means having a first end and a second opposite end, said first end being coupled to said head supporting means; and
motor means for causing said feed screw means to move said magnetic head to the predetermined position of the magnetic head, said motor means being supported by said base member and having a rotation shaft extending in the widthwise direction of the tape and being coupled with said second end of said feed screw means.

5. A magnetic head guiding device according to claim 4, wherein the magnetic tape has a width of ¼ inch and at least 16 tracks.

6. A magnetic head guiding device according to claim 4, there is a first distance between an outermost point on each of the rolling members held by said first retainer side and an outermost point on a corresponding one of the rolling members held by the second retainer side, a second distance between an innermost point on each of the rolling members held by said first retainer side and an innermost point on a corresponding one of the rolling members held by said second retainer side, a third distance between each of the contacts of said first fixed rail guide groove with the rolling members arranged between said first fixed rail guide groove and said first movable rail guide groove and the corresponding contacts of said second fixed rail guide groove with the rolling members arranged between said second fixed rail guide groove and said second movable rail guide groove, and a fourth distance between each of the contacts of said first movable rail guide groove with the rolling members arranged between said first fixed rail guide groove and said first movable rail guide groove and corresponding ones of the contacts of said second movable rail guide groove with the rolling members arranged between said second fixed rail guide groove and said second movable rail guide groove, and wherein a difference between said first and second distances is slightly larger than a difference between said third and fourth distances.

7. The device according to claim 4, further comprising an elastic means for biasing said head supporting means away from said base member.

8. The device according to claim 4, wherein said base member is formed integral with said motor means.

9. The device according to claim 4, wherein said motor means includes a stepping motor.

10. The device according to claim 9, wherein said magnetic tape has 16 tracks, each said track has a pitch of 360 µm, said feed screw means has a pitch of 360 µm, said motor means has a rotation angle of 15 degrees per step, said magnetic head is fed at 15 µm per step of said motor means, and said magnetic head is moved 24 steps from one track to an adjacent track on the magnetic tape.

11. The device according to claim 9, wherein said magnetic tape has 26 tracks, each said track has a pitch of 228.6 µm, said feed screw means has a pitch of 1.27 mm, said motor means has a rotation angle of 0.9 degrees per step, said magnetic head is fed at 3.175 µm per step of said motor means, and said magnetic head is moved 72 steps from one track to an adjacent track on the magnetic tape.

12. A magnetic head guiding device for guiding a magnetic head of a data recording/reproducing apparatus over a multi-track magnetic tape in a widthwise direction of the tape in order to record data on and/or reproduce data from the magnetic tape, said magnetic head guiding device comprising:
  a base member;
  a fixed guide rail member supported by said base member, said fixed guide rail member including:
    a substantially U-shaped cross-section,
    opposite first and second fixed guide rail sides,
    a first fixed rail guide groove formed in said first fixed guide rail side, said first fixed rail guide groove having a V-shaped cross-section and extending in the widthwise direction of the tape, and
    a second fixed rail guide groove formed in said second fixed guide rail side and separated from said first fixed rail guide groove in a direction perpendicular to the widthwise direction of the magnetic tape, said second fixed rail guide groove having a V-shaped cross-section and extending in the widthwise direction of the tape; and
  a movable guide rail member movable in the widthwise direction of said tape, said movable guide rail member including:
    a substantially U-shaped cross-section,
    opposite first and second movable guide rail sides,
    a first movable rail guide groove formed in said first movable guide rail side in opposition to said first fixed rail guide groove and having a V-shaped cross-section, and
    a second movable rail guide groove formed in said second movable guide rail side in opposition to said second fixed rail guide groove and separated from said first movable rail guide groove in a direction perpendicular to the widthwise direction of the magnetic tape, said second movable rail guide groove having a V-shaped cross-section;
  a plurality of spherical rolling members arranged in rolling contact with and between said first fixed rail guide groove and said first movable rail guide groove, and between said second fixed rail guide groove and said second movable rail guide groove, with dimensions between said first fixed rail guide groove and said first movable rail guide groove and between said second fixed rail guide groove and said second movable rail guide groove are such that said guide grooves apply a pressure to said rolling members therebetween so as to prevent said rolling members from falling out from spaces between said opposite sides of said fixed guide rail member and said opposite sides of said movable guide rail member; and
  head supporting means for supporting the movable guide rail member and the magnetic head such that said magnetic head is movable together with said movable guide rail member.

13. A magnetic head guiding device according to claim 12, wherein the magnetic tape has a width of ¼ inch and at least 16 tracks.

14. A magnetic tape guiding device according to claim 12, there is a first distance between an outermost point on each of the rolling members arranged between said first fixed guide rail side and said first movable guide rail side and an outermost point on a corresponding one of the rolling members held between said second fixed guide rail side and said second movable guide rail side, a second distance between an innermost point on each of the rolling members held between said first fixed guide rail side and said first movable guide rail side and an innermost point on a corresponding one of the rolling members held between said second fixed guide rail side and said second movable guide rail side, a third distance between each of the contacts of said first fixed rail guide groove with the rolling members arranged between said first fixed rail guide groove and said first movable rail guide groove and the corresponding contacts of said second fixed rail guide groove with the rolling members arranged between said second fixed rail guide groove and said second movable rail guide groove, and a fourth distance between each of the contacts of said first movable rail guide groove with the rolling members arranged between said first fixed rail guide groove and said first movable rail guide groove and corresponding ones of the contacts of said second movable rail guide groove with the rolling members arranged between said second fixed rail guide groove and said second movable rail guide groove, and wherein a difference between said first and second distances is slightly larger than a difference between said third and fourth distances.

15. The device according to claim 12, further comprising:
  feed screw means for moving said magnetic head to a predetermined position on the magnetic tape in the widthwise direction of the tape, said feed screw means having a first end and a second opposite end, said first end being coupled to said head supporting means; and motor means for causing said feed screw means to move said magnetic head to the predetermined position of the magnetic head, said motor means being supported by said base member and having a rotation shaft extending in the widthwise direction of the tape and being coupled with said second end of said feed screw means.

* * * * *